No. 706,343. Patented Aug. 5, 1902.
T. D. RADCLIFFE.
WHEELED SCRAPER.
(Application filed Nov. 12, 1901.)
(No Model.) 2 Sheets—Sheet 1.
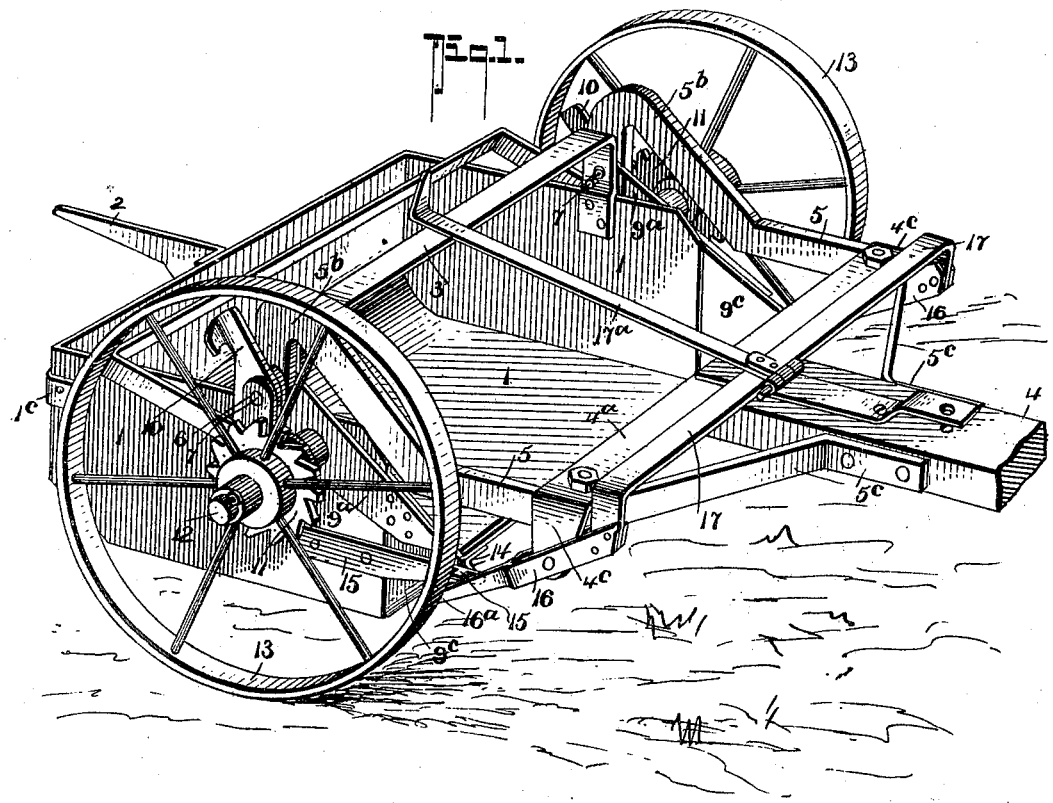
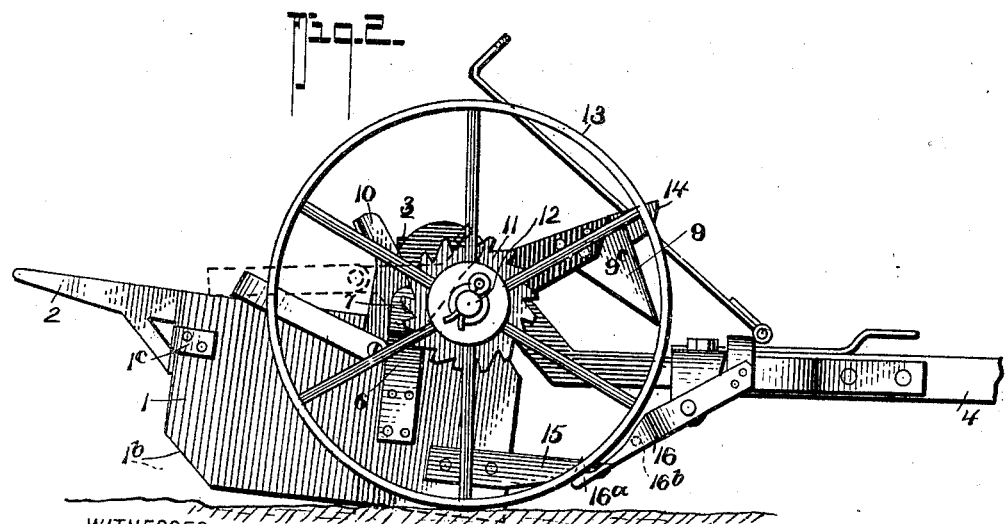
WITNESSES:
Guy V Worthington
Louis Dieterich
INVENTOR
Thomas D. Radcliffe.
BY
Fred J. Dieterich & Co.
ATTORNEYS.

No. 706,343. Patented Aug. 5, 1902.
T. D. RADCLIFFE.
WHEELED SCRAPER.
(Application filed Nov. 12, 1901.)
(No Model.) 2 Sheets—Sheet 2.
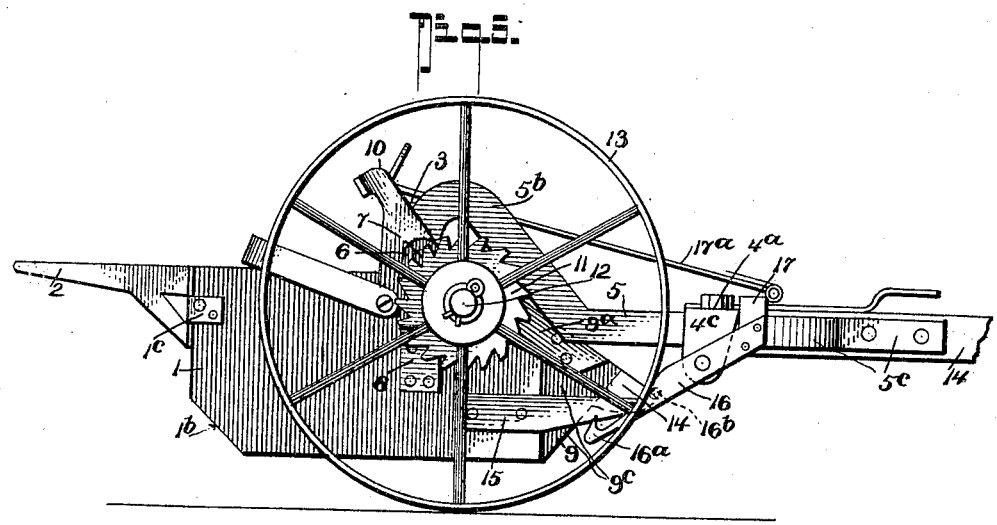
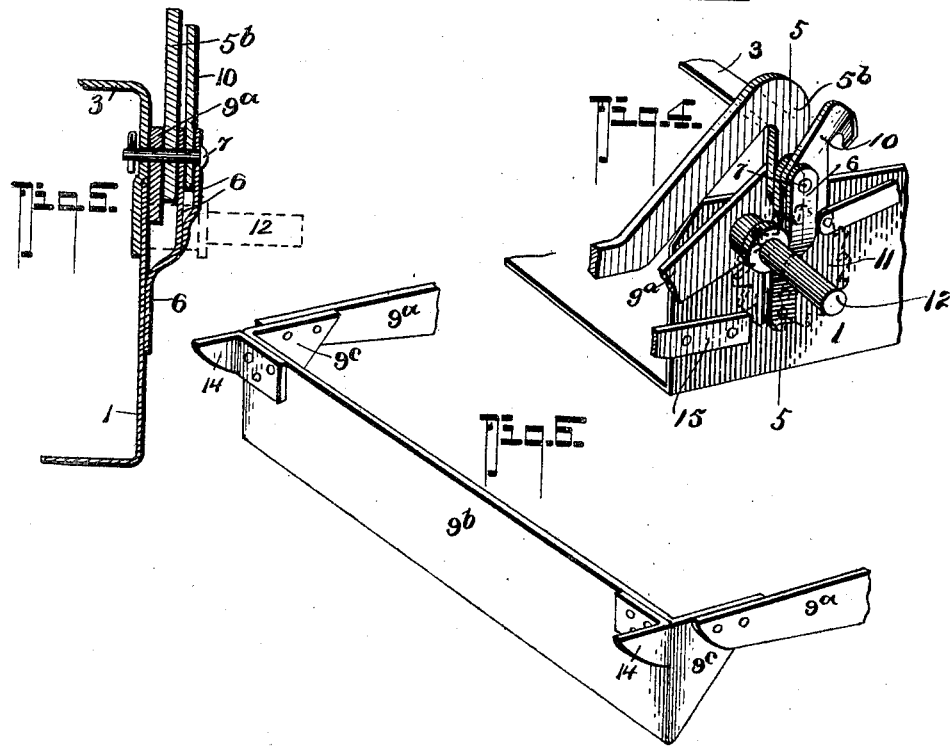
WITNESSES:
Guy Worthington
Louis Dietrich
INVENTOR
Thomas D. Radcliffe.
BY
Fred G. Dieterich
ATTORNEYS.

UNITED STATES PATENT OFFICE.

THOMAS D. RADCLIFFE, OF LAWRENCE, KANSAS, ASSIGNOR OF ONE-THIRD TO CHARLES RICH METCALF, OF LAWRENCE, KANSAS.

WHEELED SCRAPER.

SPECIFICATION forming part of Letters Patent No. 706,343, dated August 5, 1902.

Application filed November 12, 1901. Serial No. 82,024. (No model.)

*To all whom it may concern:*

Be it known that I, THOMAS D. RADCLIFFE, residing at Lawrence, in the county of Douglas and State of Kansas, have invented a new and Improved Wheeled Scraper, of which the following is a specification.

My present invention relates to improvements in earth scrapers or scoops; and it primarily seeks to provide a wheeled scraper of a very simple and economical construction, capable of being easily manipulated, and which will effectively serve for its intended purposes.

In its generic nature my invention comprehends a novel arrangement of pan-supporting and draft devices and special means for sustaining the pan in its raised or normal position and preventing it from dumping or falling to the ground during transportation, it also including lever devices operated from the rear of the pan for releasing the hooks or detents that sustain the pan, coöperatively combined with the pan and the supporting or drive wheels.

In its more subordinate nature my invention consists in certain details of construction and peculiar combination of parts, all of which will hereinafter be fully explained, and particularly pointed out in the appended claims, reference being had to the accompanying drawings, in which—

Figure 1 is a perspective view of my improved wheeled scraper, the pan being in its elevated or normal position. Fig. 2 is a side elevation of the same, the pan being at its lower or scraping position, the latch-frame being shown adjusted to engage the ratchet-disks for lifting the pan in dotted lines. Fig. 3 is a similar view illustrating the pan elevated and the twin-hook devices in position for locking same and the end-gate from dropping. Fig. 4 is a detail perspective view of one of the stub-axles, the ratchet-disk, and the arched frame-piece hereinafter referred to. Fig. 5 is a section of the same on the line 5 5 of Fig. 4. Fig. 6 is a detail view of the end-gate, and Fig. 7 is a view illustrating the manner in which the twin-hook latch member engages the pan-hook and end-gate lug members.

In its practical construction my improved wheeled scraper comprises a pan 1, having the usual scoop shape. This pan is made of a single metal blank cut to permit of its sides and rear portion being bent up to the shape shown, the sides having extensions $1^a$, adapted to bend over the rear or back end, which end is further braced by angle-plates $1^c$.

2 designates a handle member secured to and projected rearwardly from the pan, and 3 denotes an arched brace-bar that extends transversely over the pan and has its ends made fast thereto, as shown.

4 designates the draft-tongue, the rear end of which is fixedly joined to a transversely-disposed draft-bar $4^a$, which in the construction shown is of angle-bar shape, the ends of the top portion of which are bent to form pendent ears $4^c$, the purpose of which will presently appear.

5 designates what I term the "pan and end-gate frame," as upon this frame the pan and end-gate are pivotally suspended. The frame 5 consists of the side members, the front portion of which are bent inward and made fast to the tongue sides, as indicated by $5^c$, and the rear parts $5^b$ extend inside the pendent ears $4^c$ and straddle the end-gate side members and the pan and project to the rear of the stub-axles, said frame parts $5^b$ where they pass over the axles being arched to permit of proper swing of the several parts, as hereinafter will be fully explained.

At each side the pan has fixedly attached thereto a lift or pivot bracket 6 6, and in the brackets 6 the ends $5^b$ of the frame 5 are pivotally mounted on the pivot-pins 7 7, that pass through the upper end of the brackets 6 and into the pendent members of the pan brace-bar. (See Fig. 1.)

Pivotally mounted on the pins 7 7 are the side arms $9^a$ of the end-gate 9, which includes the front cross member $9^b$, having triangular-shaped inwardly-extending ends $9^c$, disposed in a plane with the sides of the pan to form closure ends or continuations of the pan sides when the end-gate is dropped to hold in the load during transportation.

10 10 designate rocker-latch members, also pivotally supported on the studs or pins 7 7. These latch members each have an outwardly-projecting hook on their front end adapted when properly shifted in the manner hereinafter explained to drop into engagement with ratchet-disks 11 11, mounted on the carrier-wheel hubs 12, as best shown in Fig. 3.

The rear ends of the latch members 10 10 have pivotally joined therewith a U-lever, that extends over and rests upon the pan in a manner to provide for conveniently operating the latches 10 10 from the rear of the pan.

12 12 designate the stub-axles, fixedly connected to and projected out from the side members of the end-gate, and 13 13 the supporting-wheels, loosely mounted to turn freely on said axles. The hub of each wheel carries a ratchet-wheel, with which the latch members coöperate, as presently explained.

At each end and at the upper front corner the end-gate has forwardly-projecting lips 14, and at the front edge the side members of the pan each have a forwardly-projecting latch or stationary hook 15, which, as also the lips 14 14, are arranged to coöperate with a double or twin hook latch, the peculiar construction of which and method of operation is best shown in Fig. 1, by reference to which it will be noticed the twin-hook latches 16 are pivotally mounted on the pendent members of the cross angle-bar $4^a$, and said latches extend rearwardly and have their hook ends $16^a$ projected upwardly and disposed to engage the stationary hooks 15 15 when the several parts are adjusted, as presently explained. Each latch member 16 has an inwardly-projecting stud $16^b$ to coöperate with the lip projections on the front of the pan end-gate.

To provide for operating the latches in unison and from the rear of the pan, the said latches are connected by a cross-bar 17, to which is pivotally connected an operating-lever $17^a$, adapted to extend to the rear of the machine, as shown.

From the foregoing description, taken in connection with the accompanying drawings, it is thought the complete construction of my invention will be readily understood.

To operate my improved wheeled scraper, by pushing the machine backward the pan will drop down to a scraping position, as shown in Fig. 1. To lift the loaded pan, the latch-frame is pulled on to bring the latches into engagement with the ratchet-disks on the wheel-hubs, and by reason of the pivot of the said latches being to the rear of the stub-axles a forward pull on the machine will swing the pan upward, and in thus moving the rear ends of the side members of the end-gate will be elevated, and as the stub-axles form the fulcrum-points of said side members it follows the front or end-gate member will be moved downward to a closing position as the pan is being elevated to form a closure member to hold the load within the pan, it being understood that during the said pan-elevating and end-gate-closing operation the stub-axles will turn freely within the wheel-hub. As the pan rises to the limit of its up movement and the pan closes down over the front end of the pan the hook members or latches that project forward from the pan passes over and engages the latch end of the twin-hook members, while the stud projections or second hooks move into position over the upper edge of the projecting lips on the end-gate, the several latch members being then in position (see Fig. 3) to hold the pan from dropping and the end-gate from opening, and thereby maintain the pan with the load in proper and secure position for transportation. To dump the load, the lever that controls the twin hooks is pulled back to release the said twin hooks from pan and end-gate. This will allow the pan to drop and end-gate to rise sufficiently to permit dumping.

Slight changes and modifications of the parts shown may be readily made without departing from the scope of the appended claims.

Having thus described my invention, what I claim, and desire to secure by Letters Patent, is—

1. A wheeled scraper, comprising a pan, an end-gate therefor, having side arms straddling the pan, and pivotally secured to the pan sides; stub-axles projected from said arms at a point forward of their pivotal connection, wheels loosely mounted on the said axles; a draft-tongue, and means for locking the pivotal connections of the side arms with the wheels, whereby to elevate the pan as the wheels rotate forward, for the purpose described.

2. A wheeled scraper, comprising in combination, a pan, an end-gate closable over the front of the pan, said end-gate including side arms adapted to straddle the pan, and pivotally secured to said pan, stub-axles projected from the said side arms at a point in advance of their pivotal connection, wheels loosely mounted on said axle, and devices for connecting the pivotal connections with the wheels at a point forward of the center of the pan, whereby to lift the pan and simultaneously lower the end-gate as the wheels are drawn forward, substantially as described.

3. A wheeled scraper, comprising in combination with the supporting-wheels, the vertically-movable pan and independently-movable end-gate, a twin-hook latch mechanism for automatically engaging the pan and end-gate as they come together to hold the pan elevated and the end-gate closed for transportation, and means for tripping said twin-hook latch mechanism, for the purposes described.

4. A wheeled scraper, having a vertically-movable pan and a downwardly-closing end-gate, and mechanism controlled by the forward movement of the wheels for effecting the lifting action of the pan and closure of end-gate; of detent devices for automatically engaging the pan and the end-gate to hold them to their coöperative position, and means including a handle extended back over the pan for releasing said detent devices, substantially as shown and for the purposes described.

5. The combination with the stub-axles and the wheels, said stub-axles having rearwardly-extending frame-pieces fixedly connected thereto; of the pan, connections for pivotally supporting the pan on the frame-pieces, and means for locking the said pivotal connections with the wheels, substantially as shown and for the purposes described.

6. The combination with the stub-axles, having rearwardly-extending portions, and the wheels; of the pan, connections for pivotally supporting the pan on the end of said extending portions, means for interlocking the said pivotal connections with the wheels, and detent devices including hand-operated tripping-lever for engaging the pan and holding it to its elevated position, as specified.

7. The combination with the stub-axles, the frame-pieces extended rearwardly therefrom, and the wheels loosely mounted on the axles, and having ratchet-disk portions; of the pan pivotally supported on the axle frame-pieces, latches pivotally supported on the pan, and lever devices including a handle member for throwing said latches into engagement with the ratchet-disks on the wheel, substantially for the purposes described.

8. The combination with the stub-axles, the supporting-wheels loosely mounted thereon, frame-pieces fixedly connected to the axle and extended rearwardly of the pan pivotally suspended from said frame-pieces, means joining the pan with the wheels to lift it, said pan having forwardly-projecting latch-hooks, the draft-tongue pivotally connected to the pan, pivoted latches on said tongue for engaging the pan latch-hooks when the pan is elevated, and means for releasing the draft-tongue-supported latch-hooks, substantially as shown and described.

9. The combination of the pan, the end-gate having side arms straddling the pan, the draft-tongue having side arms to straddle the pan, a pivoted latch member at each side of the pan, a single pivot-pin on each side of the pan, forming a fulcrum for the ends of the end-gate and tongue side arms, and the latches at each side, stub-axles projected from the end-gate side arms at a point forward of the pan pivot-pins, the carrier-wheels loosely mounted thereon, ratchet-disks fixedly held on the wheels in a plane with the pivoted latches, means controlled from the rear of the pan for shifting said latches into engagement with the ratchet-disks, and hand-lever-released detents for automatically engaging the pan and end-gate to hold said pan and end-gate to their coöperating position, for the purposes specified.

THOMAS D. RADCLIFFE.

Witnesses:
 LEWIS S. STEELE,
 CHAS. R. METCALF.